(12) United States Patent
Nishida et al.

(10) Patent No.: US 6,924,819 B2
(45) Date of Patent: Aug. 2, 2005

(54) IMAGE PROCESSOR

(75) Inventors: Yukihiro Nishida, Fukuoka (JP); Seiichiro Hiratsuka, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 3 days.

(21) Appl. No.: 10/706,905

(22) Filed: Nov. 14, 2003

(65) Prior Publication Data

US 2004/0145759 A1 Jul. 29, 2004

(30) Foreign Application Priority Data

Nov. 18, 2002 (JP) .................................... P. 2002-333381

(51) Int. Cl.$^7$ ................................................ G09G 5/02
(52) U.S. Cl. ...................... 345/604; 345/596; 345/643; 382/162; 382/167; 348/659; 358/1.9; 358/515; 358/518; 358/529; 358/535
(58) Field of Search ................................. 345/595, 604, 345/692; 358/535

(56) References Cited

U.S. PATENT DOCUMENTS

| | | | | |
|---|---|---|---|---|
| 4,682,216 A | * | 7/1987 | Sasaki et al. | 358/529 |
| 5,838,333 A | * | 11/1998 | Matsuo | 345/604 |
| 6,404,509 B1 | * | 6/2002 | Kuwata et al. | 358/1.9 |
| 6,404,914 B1 | * | 6/2002 | Tanioka et al. | 382/162 |
| 2002/0085249 A1 | * | 7/2002 | Tsuda et al. | 358/515 |

FOREIGN PATENT DOCUMENTS

JP 341547 12/2000

OTHER PUBLICATIONS

English language Abstract of JP No. 2000–341547.
"PDL Color Rendering Compliant with Windows Environment", published at Fuji Xerox Technical Report, No. 12, 1998.

* cited by examiner

*Primary Examiner*—Matthew C. Bella
*Assistant Examiner*—Antonio Caschera
(74) *Attorney, Agent, or Firm*—Greenblum & Bernstein, P.L.C.

(57) ABSTRACT

An image processor includes: a color conversion unit for converting an input signal to color signals of at least four colors; a gamma correction unit for performing gamma correction on the color signals; a binarization unit for binarizing the color signals through comparison with a threshold value; a superimposing unit for superimposing a color signal of at least one color but of the binarized color signals on another color signal to convert the signals to a superimposed color signal; logical operation unit for performing a logical operation previously defined for an image of three or fewer colors on the superimposed color signal; and a separator for separating color signals as an output of the logical operation unit into separated color signals of at least four colors.

4 Claims, 18 Drawing Sheets

FIG. 11

| CYCLICITY C | CYCLICITY M | CYCLICITY Y | CYCLICITY K | C | M | Y | K |
|---|---|---|---|---|---|---|---|
| 0 | 0 | 0 | 0 | 0 | 0 | 0 | 1 |
| 0 | 0 | 0 | 1 | 0 | 0 | 0 | 1 |
| 0 | 0 | 1 | 0 | 0 | 0 | 0 | 1 |
| 0 | 1 | 0 | 1 | 0 | 0 | 1 | 1 |
| 0 | 1 | 0 | 0 | 0 | 0 | 0 | 1 |
| 0 | 1 | 0 | 1 | 0 | 1 | 0 | 1 |
| 0 | 0 | 1 | 0 | 0 | 0 | 0 | 1 |
| 1 | 0 | 0 | 1 | 0 | 1 | 1 | 1 |
| 1 | 0 | 1 | 0 | 1 | 0 | 0 | 1 |
| 1 | 1 | 0 | 1 | 0 | 0 | 0 | 1 |
| 1 | 1 | 1 | 0 | 1 | 0 | 0 | 1 |
| 1 | 0 | 0 | 1 | 0 | 0 | 0 | 1 |
| 1 | 1 | 1 | 0 | 1 | 1 | 0 | 1 |
| 1 | 1 | 0 | 1 | 1 | 1 | 1 | 0 |
| 1 | 1 | 1 | 1 | 1 | 1 | 1 | 1 |

IMAGE PROCESSOR

CROSS REFERENCE TO RELATED APPLICATION

This application is based upon and claims the benefit of priority of Japanese Patent Application No. P2002333381 filed on Nov. 18, 2002, the contents of which are incorporated herein by reference in its entirety.

BACKGROUND OF THE INVENTION

The present invention relates to an image processor used for image formation on a color printer which employs electronic photography.

In recent years, more and more color images have been printed by printers in offices and homes in line with widespread use of computers and color printers.

FIG. 12 illustrates the connection form of a host computer 50 and a color printer 1. The color printer 1 is connected to the host computer 50 via an interface 53 such as IEEE1284, or a network such as a LAN 51 and the internet 52. The color printer 1 and the host computer 50 communicate print data and printer status information with each other.

FIG. 13 is a block diagram of the printer. A numeral 2 designates a controller section for interpreting image data transmitted from the host computer 50 to generate a print image, and a numeral 3 designates a printer engine for forming print data on a recording medium by using the principle of electronic photography.

Configuration and operation of the controller are summarized below. The controller section includes an interface 4 for performing data communications with the host computer 50, an interpreter 5 for interpreting print data, a rasterizer 6 for forming print image on a memory, a compressor 7 for compressing print image, and an expander 8 for expanding compressed print image. Image data transmitted from the host computer 50 is input to the interpreter 5 via the interface 4. The interpreter 5 interprets the image data and creates drawing data. The rasterizer 6 extends print image on a band memory (not shown) where a single page is split in units of a plurality of lines base on drawing data. The extended print image is huge size so that it is temporarily compressed by the compressor 7 and saved into a compression memory (not shown). When a single-page print image is stored into the compression memory, operation of the printer engine 3 is started and the temporarily saved compressed print image is expanded by the expander 8 while being transmitted to the printer engine 3.

Next, configuration and operation of the printer engine 3 are described below.

The printer engine 3 includes a laser drive 9, a polygon mirror 10 which has undergone mirror finished in polygon, a photosensitive body 11 for forming an electronic latent image by way of a laser, developing units 12 for cyan, magenta, yellow and black (hereinafter referred to as C, M, Y and K), an intermediate transfer body 16 for transferring a toner image formed by the developing units 12 to retain a CMYK toner image, a paper cassette 17 accommodating recording paper, and a fuser 19 for fusing on paper with heat a toner image transferred onto paper. The laser drive 9 irradiates a laser light onto the polygon mirror 10 revolving in high speed while making laser blinking control in accordance with the data transmitted from the controller 2. A reflected laser light is irradiated onto the photosensitive body 11 and a latent image is formed on the photosensitive body 11. In this practice the main scan lines of the image are formed by the revolution of the polygon mirror 10. The latent image is formed by the developing unit 12 as a CMYK toner image. The toner image on each photosensitive body 11 is temporarily transferred onto the intermediate transfer body 16. The photosensitive body 11 and the developing unit 12 are serially arranged with respect to the drive direction of the intermediate transfer body 16 so that the intermediate transfer body can retain an image where CMYK toners on a single page have superimposed one on the other. The recording paper 13 is conveyed from the paper cassette 17 in synchronization with the movement of the intermediate transfer body. The toner image is transferred by a transfer unit 18 onto the recording paper 13 from the intermediate transfer body 16. Then the toner image is fixed with heat and a final output image is obtained.

FIG. 14 illustrates a related art image processor.

The image processor is included in the interpreter 5 in FIG. 13 and performs color conversion to device colors and binarization. The interpreter 5 includes a color converter 20 for converting RGB color signals to CMYK color signals, a gamma correction section 21 for correcting engine output characteristics, and a screen processor 22 for comparing an image with a threshold matrix and binarizing the image. Operation of each section is described below. RGB image data transmitted from the host computer 50 must be converted to CMYK data as device colors of the printer. The RGB image data is converted by a color converter 20. An RGB signal and a CMY signal comprise 256-level data having 0 to 255 levels, and in order to discriminate from the binary signal of CMYK, the signals are described as, for example R(255) in FIG. 14. In the color converter 20, the correspondence between an RGB signal and a CMYK signal has a non-linear characteristic. Thus, conversion from an RGB signal to a CMYK signal is made by retaining the correspondence between representative colors in a lookup table (hereinafter referred to as the LUT) and obtaining the points other than the representative points by interpolating the representative points. While the LUT is used to obtain the values of four colors CMYK in this example, it is possible to first obtain the values CMY in the LUT, then obtain CMYK through base color removal processing.

A CMYK signal as an output of the color converter 20 is further corrected by a gamma correction section 21. FIG. 15A shows an output density characteristic and FIG. 15B shows a gamma correction curve. In a printer engine using the principle of electronic photography, the relationship between an output signal and the density of an output image is linear as shown in FIG. 15A and differs depending on the material of a member such as a toner or for a printing process. This it is necessary to perform output level adjustment of CMYK independently of color conversion. By having gamma correction tables for CMYK representing the inverse function shown in FIG. 15B of the gamma correction curve in FIG. 15A and converting CMYK by using the tables, linearity of the output is obtained.

Next, binarization is made for each plane CMYK by the screen processor 22. FIG. 16 is an example of a screen matrix where threshold values corresponding to pixel levels of an image are arranged. By using separate threshold arrangements for four colors CMYK and setting a pixel equal to or larger than the threshold value of the screen matrix to 1 and setting a pixel smaller than the threshold value to 0, binary data of each of CMYK is obtained. In FIG. 14, description is made such as C(2) or CMYK(2) in order to represent CMYK binary data. Laser driving of the printer engine 3 is made based on the binary data.

By the way, there is known the Raster Operation processing (hereinafter referred to as the ROP processing) used for drawing objects on Windows widely used as the OS of the host computer 50. The ROP is a logical arithmetic processing made in superimposing more than one drawing object (raster image). The ROP processing performs a logical operation such as AND, OR, NOT and XOR on each object as well as an upper image of a set of an upper image and a lower image to give the effects of transparency and inversion. Note that the ROP processing is defined for an RGB image and C, M, Y, K data as device colors of a printer undergoes a logical operation by using the corresponding complementary colors. It is known that the ROP processing is unsuccessful in case this approach is used for binary data of CMYK thus it is necessary to use binary data of CMY without generating K data in color conversion (for example, refer to Takashi Hashizume, Kiyoshi Une, "Windows ni taiou shita PDL no iroshori-Raster Operation no taiou-", Fuji Xerox technical report No. 12, 1998 tokushuu ronbun, [Retrieved Feb. 15, 2002] Internet URL: http://www.fujixerox.co.jp/randd/12/24 hasid/trl01j.html>).

FIG. 17 shows another example of a related art image processor. The image processor comprising a color converter for outputting CMY data performs RGB-to-CMY conversion in the color converter 20 then the ROP processing to generate a CMY print image. In case CMY binary data is transmitted to the printer engine without conversion and a CMY image is obtained as an output image, a black image appears as an image where three colors CMY are superimposed one on the other. This result is accompanied by numerous problems including: (1) The black color comprising three toner colors appears more chromatic; (2) A slight displacement in the print position of each color results in a black image surrounded by colors; (3) The total volume of toner is large so that transfer is unsuccessful in a printing process; (4) Fused toner comes off in scales; and (5) Toner three times as much as that required elsewhere is used, which is uneconomical.

In order to solve these problems, a simple binary CMY-to-binary CMYK conversion may be used whereby, of the binary CMY data, for the pixels in a portion where the CMY data corresponds to 1 at the same pixel position, K is replaced with 1 and CMY to 0.

FIG. 18 is a block diagram of a related art image processor where this processing is introduced. A numeral 20 designates a color converter for converting RGB color signals to CMY color signals, 21 a gamma correction section for correcting engine output characteristics, 22 a screen processor for comparing an image with a threshold matrix and binarizing the image, 24 an ROP processor for performing ROP processing, and 55 a K replacement processor for replacing CMY superimposed pixels with K.

FIGS. 19A to 19H illustrate the operation of the K replacement section. FIG. 19A shows a C plane, FIG. 19B an M plane, and FIG. 19C a Y plane. These figures show respective pixels in shading with lines. FIG. 19D shows three planes CMY superimposed one on the other, where the pixels in the center is the portion where CMY are superimposed. The pixels are replaced with K pixels. FIG. 19E shows a C plane obtained after K replacement, FIG. 19F an M plane obtained after K replacement, FIG. 19G a Y plane obtained after K replacement, and FIG. 19H a K plane obtained after K replacement.

In the printer engine using the principle of electronic photography, an attempt to form small dots shortens the laser lighting duration. This leads to insufficient latent image formation so that small dots are degenerated, shrink, or may disappear. As shown in FIGS. 19A through 19C, C and M are formed as concatenation of three pixels and Y as concatenation of two pixels before K placement. After K replacement, a shown in FIGS. 19E through 19H, all pixels are isolated pixels because pixels obliquely arranged have lower concatenation and assumed as isolated from each other. An image comprising CMY pixels before K replacement as shown in FIG. 19D turns into an image comprising isolated pixels so that all pixels disappear on the printed matter. In case this phenomenon is observed in a wide range, a portion where a CMY screen is superimposed in this way appears in a large cycle due to screen cyclicity, thus generating a cyclic dot dropout. An image to be reproduced smoothly as a monochrome appears as a texture. Even in case CMY not replaced remain concatenated with the surrounding pixels to avoid dot degeneration in the process the overlapping CMY pixels are replaced with K, a method to assume black color only at the position CMY pixels overlap tends to generate isolated pixels after K replacement, thus degeneration of isolated K pixels is inevitable. Gamma correction to correct engine characteristics is skipped on K generated on the overlapping CMY so that its reproducibility is considerably subject to the influence of printer engine characteristics. Another method is to set a small region on an ROP-processed binary CMY image to obtain the black density of the small region and further obtain a new CMYK pattern based on the black density (for example, refer to the Japanese Patent Laid-Open No. 2000-341547).

This method has problems: when for example a rectangular image in a color is on a white background, the black density differs between a case where a small region is provided inside the rectangle and a case where a small region is provided across a rectangular edge sections, so that the black density may not be detected correctly for the same color. It is necessary to set a large region to some extent in order to detect the black density. The black density in this region increases and the above problem will result, in case the region includes characters or a line drawing in black. The K pattern is not always generated on characters or a line drawing so that the characters or the line drawing will be degraded.

SUMMARY OF THE INVENTION

The invention solves these problems and aims at providing an image processor which performs ROP processing on a device color without causing degradation of picture quality.

According to first aspect of the invention, an image processor comprises: color conversion means for converting an input signal to color signals of at least four colors; gamma correction means for performing gamma correction on the color signals; binarization means for binarizing the color signals through comparison with a threshold value; superimposing means for superimposing a color signal of at least one color out of the binarized color signals on another color signal to convert the signals to a superimposed color signal; logical operation means for performing a logical operation previously defined for an image of three or fewer colors on the superimposed color signal; and separation means for separating color signals as an output of the logical operation means into separated color signals of at least four colors. It is thus possible to provide an image processor capable of correctly executing a logical operation previously defined for an image of three or fewer colors on an image of at least four colors.

According to second aspect of the invention, the binarization means comprises a threshold matrix having a cyclicity for binarization and that the separation means determines whether the superimposed signal has the cyclicity of the threshold matrix used by the binarization means and generates separated color signals based on the determination result. It is thus possible to separate a temporarily superimposed image without causing picture quality degradation thereby obtaining a quality output image.

According to third aspect of the invention, the output signals of the color conversion means correspond to four colors cyan, magenta, yellow and black, that the superimposing means obtains the logical sum of a black pixel,with pixels of cyan, magenta and yellow to output the superimposed color signal as three colors cyan, magenta and yellow, and that the separation means separates an image of cyan, magenta, yellow and black from the pixels of cyan, magenta and yellow. It is thus possible to provide an image processor capable of correctly executing a logical operation previously defined for an image of three or fewer colors on four device colors cyan, magenta, yellow and black.

According to fourth aspect of the invention, when the input signal to the color conversion means is achromatic, the image processor outputs only black while setting the value of cyan, magenta and yellow to 0. It is thus possible to provide an image processor capable of printing in black alone an image drawn in achromatic color.

BRIEF DESCRIPTION OF THE DRAWINGS

FIG. 11 shows an operation table of the CMYK data generator;

DETAILED DESCRIPTION OF THE PREFERRED EMBODIMENTS (Embodiment 1)

An embodiment of the invention is described referring to FIGS. 1 through 11. Connection form of a host computer and a color printer as well as the configuration and operation of the color printer are same as those described with respect to the related art so that the corresponding description is omitted.

Figure 1:
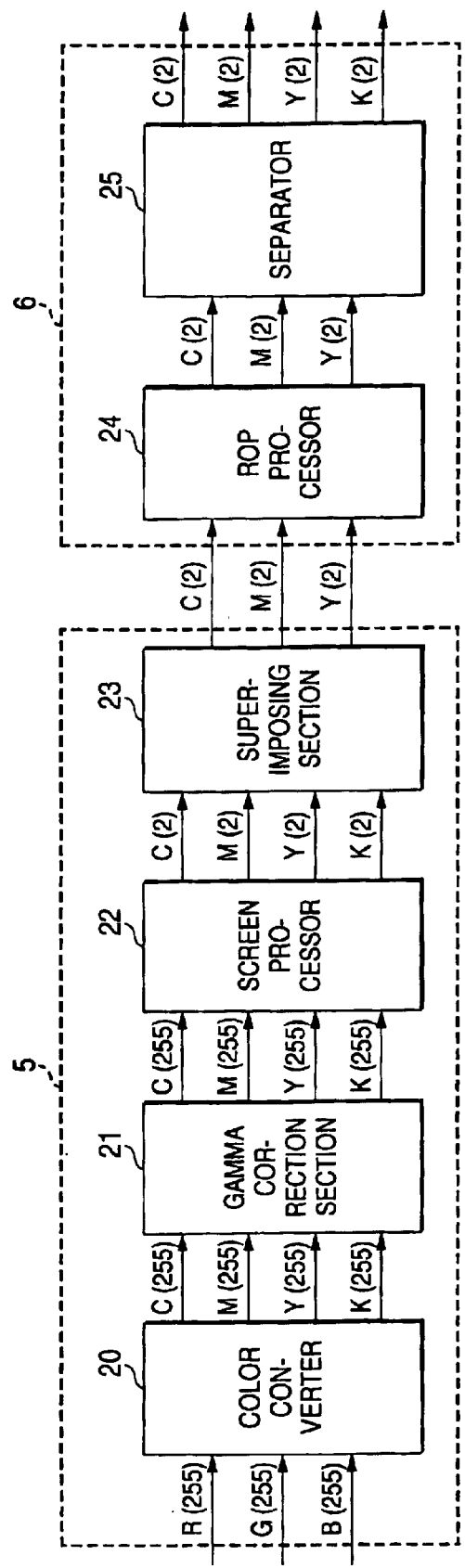
FIG. 1 illustrates an image processor according to the invention.

FIG. 1 illustrates an image processor according to the invention.

A numeral 20 designates a color converter for converting RGB color signals to CMYK color signals, 21 a gamma correction section for correcting engine output characteristics, 22 a screen processor for comparing an image with a threshold matrix and binarizing the image, 23 a superimposing section for superimposing a K image on CMY pixels, 24 an ROP processor for performing ROP processing, and 25 a separator for separating a K component image from a CMY image to generate a CMYK image.

Figure 13:
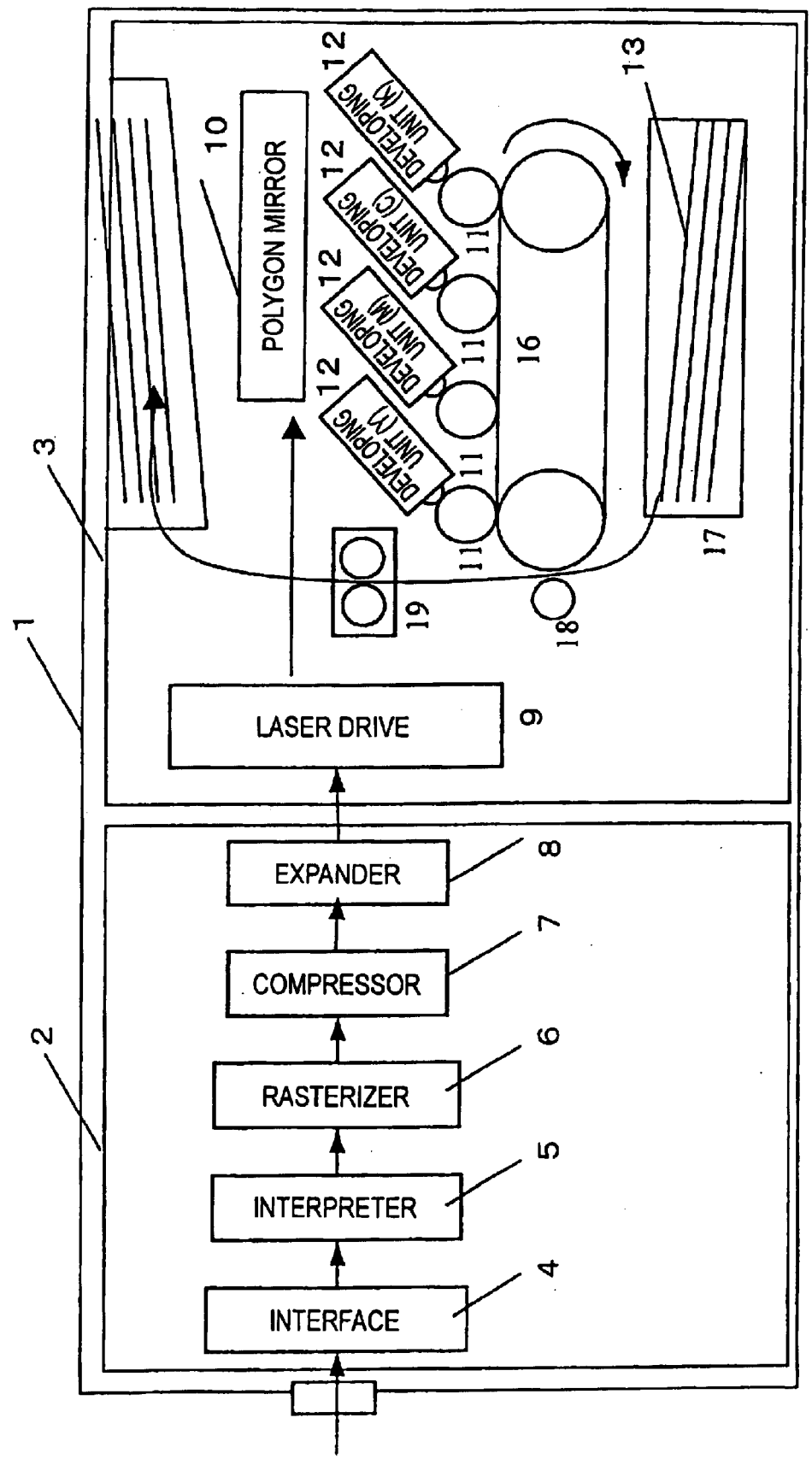
FIG. 13 is a block diagram of a printer.
Figure 14:
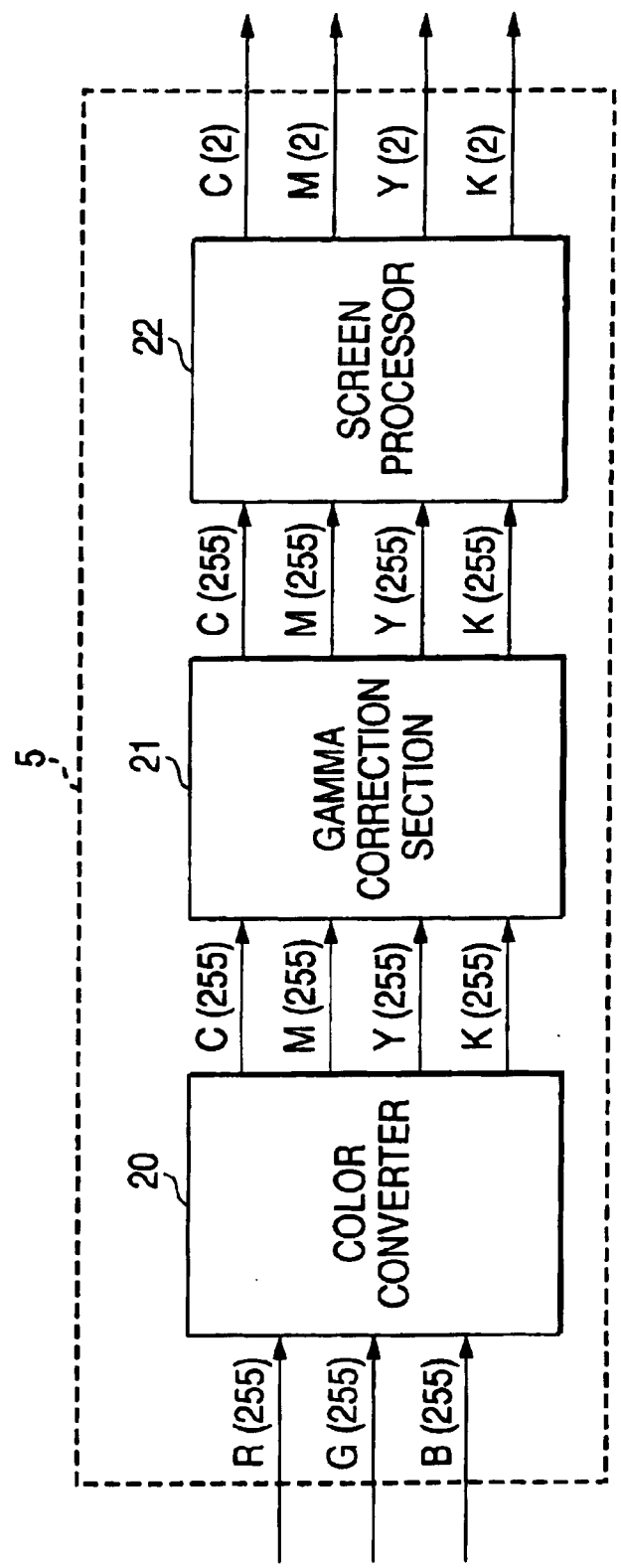
FIG. 14 illustrates a related art image processor.
Figure 15A:
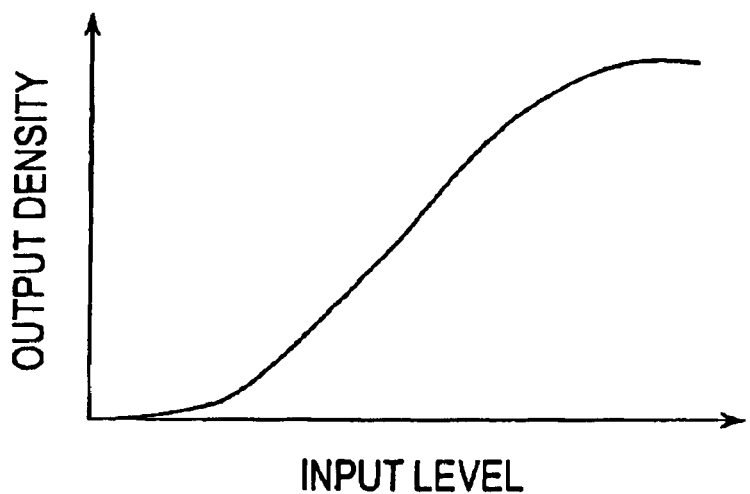
FIG. 15A shows an output density characteristic.
Figure 15B:
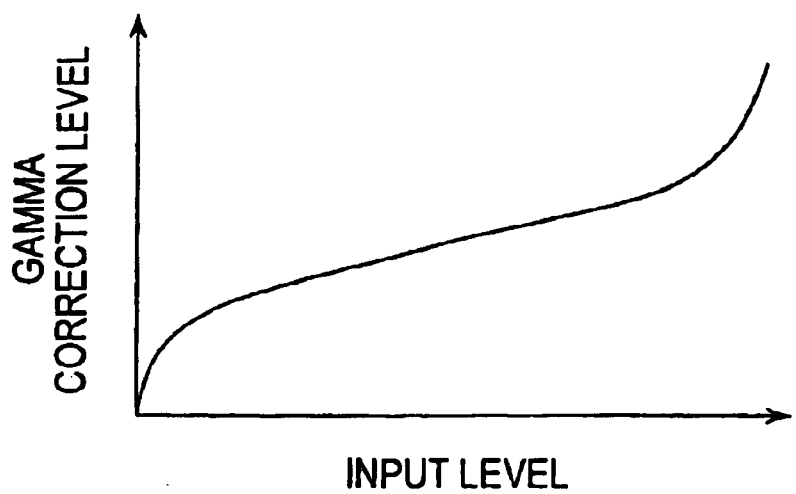
FIG. 15B shows a gamma correction curve.
Figure 16A:
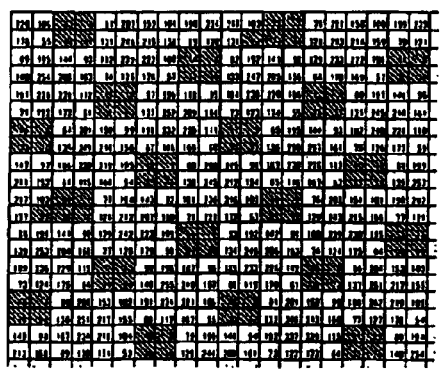
FIGS. 16A to 16D are examples of a screen matrix.
Figure 16B:
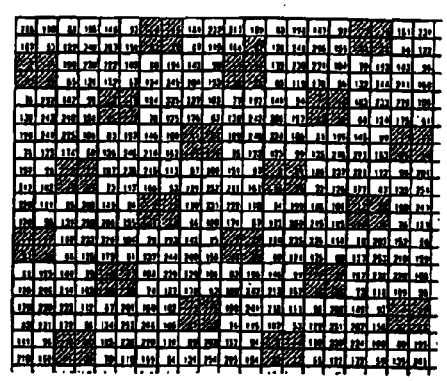
Figure 16C:
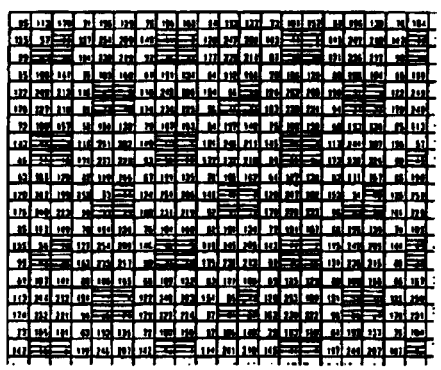
Figure 16D:
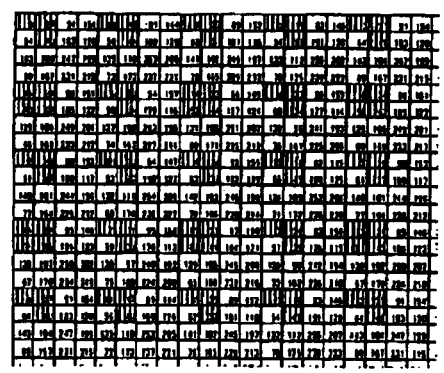
Figure 17:
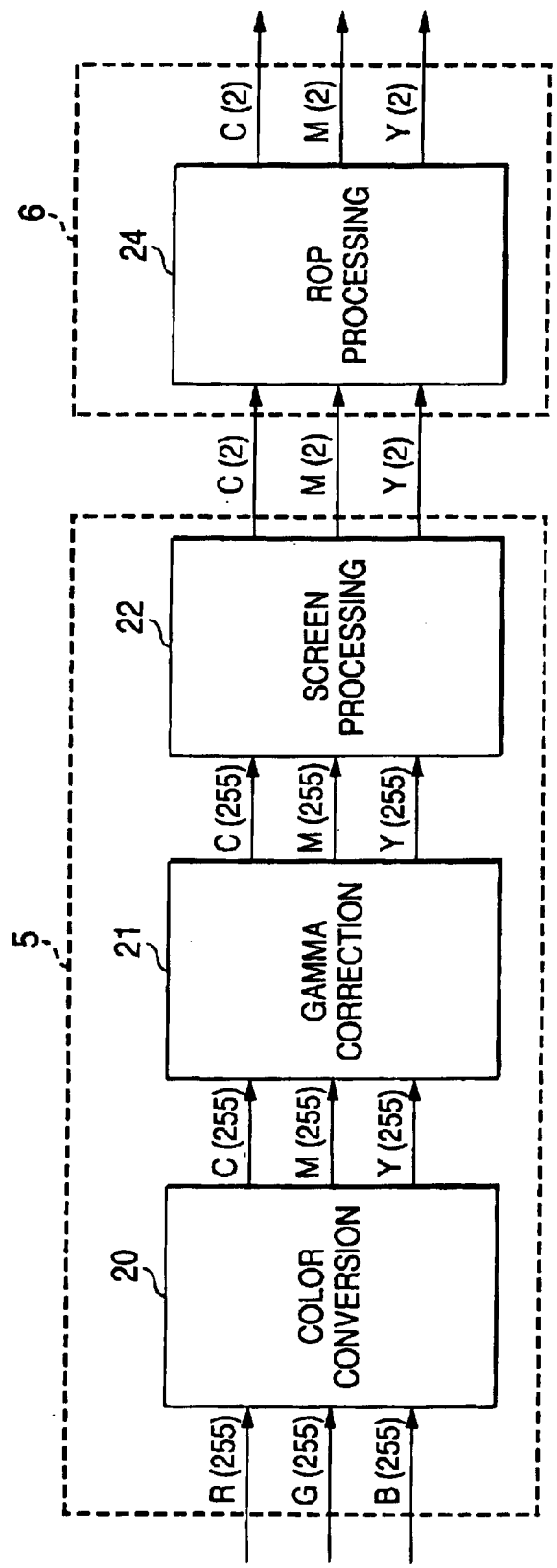
FIG. 17 shows another example of a related art image processor.
Figure 18:
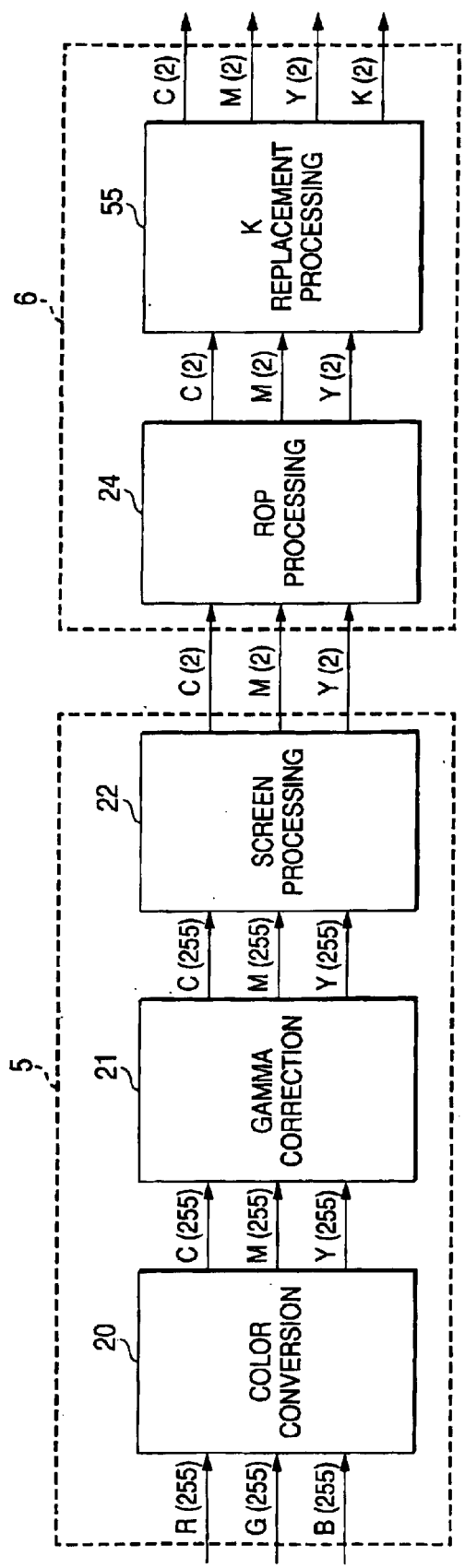
FIG. 18 is a block diagram of a related art image processor.
Figure 19E:
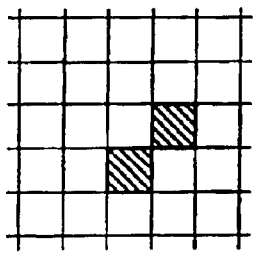
FIGS. 19A to 19H illustrate the operation of the K replacement section.
Figure 19F:
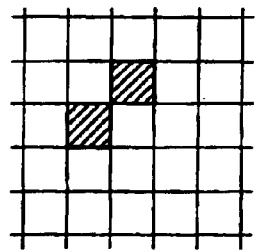
Figure 19G:
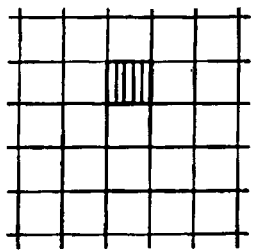
Figure 19H:
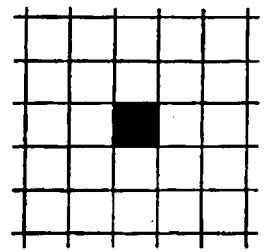
Figure 19D:
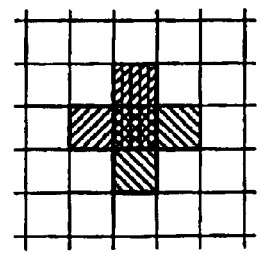
Figure 19A:
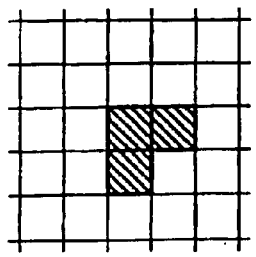
Figure 19B:
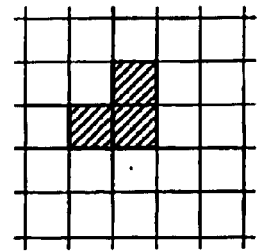
Figure 19C:
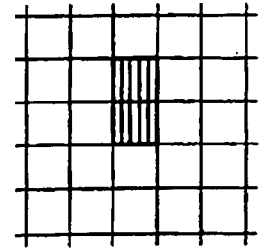

The functional blocks of the image processor in FIG. 1 is divided into the interpreter 5 and the rasterizer 6 in FIG. 13, which are enclosed with dotted lines and assigned the same numerals as FIG. 13.

Operation of each section is described below. Image data transmitted from the host computer is an RGB signal. The RGB signal is color-converted to the device colors cyan (C), magenta (M), yellow (Y) and black (K) in the color converter 20. Both an RGB signal and a CMYK signal correspond to 256-level data having gray-scale levels of 0 through 255. The correspondence between an RGB signal and a CMYK signal has a non-linear characteristic. Thus, conversion from an RGB signal to a CMYK signal is made by retaining the correspondence between representative colors in a lookup table (hereinafter referred to as the LUT) and obtaining the points other than the representative points by interpolating the representative points. In conversion from an RGB signal to a CMYK signal in the color converter 20, when the level of each signal R, G, B are equal to each other, that is, when an achromatic color is input, C, M, Y outputs are set to 0 and only K is output. By arranging so that the output of a grid point on the diagonal connecting a white point and a black point where R=G=B will be C=M=Y=0, K=k (where k is a value within the range from 0 to 255) and by performing interpolation by using a grid point on the diagonal alone for an achromatic color, only K is output in response to input of an achromatic color.

The CMYK signal as an output of the color converter 20 is corrected by the gamma correction section 21. In a printer engine using the principle of electronic photography, the relationship between an input signal and the density of an output image is linear and differs depending on the material of a member such as a toner or for a printing process. This it is necessary to perform output level adjustment of CMYK independently of color conversion. By having gamma correction tables for CMYK representing the inverse function of the relationship between an input signal and an output image and converting CMYK by using the tables, linearity of the output is obtained. Next, binarization is made for each plane CMYK by the screen processor 22. By using separate threshold arrangements for four colors CMYK as a screen matrix and setting a pixel equal to or larger than the threshold value of the screen matrix to 1 and setting a pixel smaller than the threshold value to 0, binary data of each of CMYK is obtained.

Next, the K plane is superimposed on each plane of CMY. The superimposing process is executed by logical OR operation for the K plane data and the data on CMY planes, and superimposing the information of the K plane on the CMY plane.

The data on the K plane is discarded and only the CMY data is transmitted to the next ROP processor 24. The ROP processor 24 performs ROP operation on the CMY plane data. The ROP operation is originally defined for RGB data so that CMY data temporarily undergoes complementary color processing (inversion processing), specified logical operation, and the result is inverted in order to execute successful ROP operation.

ROP-processed CMY data is input to a next K separator 25. The K separator 25 separates the K image component superimposed on the CMY image to regenerate a K image and a CMY image where the K image component has been removed.

The K separation processing is described below.

In the superimposing section 23, a K image is included in the data on each plane CMY by way of OR operation. Basically, by turning on K pixels when pixels on each plane CMY are on, a K image is generated. To be more precise, in case the C, M, Y components are 0 or achromatic color in the output of the color converter 20, the original K image is ORed with each plane C, M, Y thus providing the same pixel pattern on the C, M, Y planes. In case the same pixel pattern continues, all pixels are replaced with K pixels. Characters or a line drawing in black can be replaced with K pixel data through this processing.

In case the C, M, Y components are 1 or chromatic color in the output of the color converter 20, superimposed pixels of CMY caused by originally overlapping CMY screens are present as well as the superimposed K pixels. Generating an image by replacing all pixels with K pixels, the resulting picture equality varies. In particular, black pixels generated by overlapping CMY screens tend to appear as isolated dots. CMY where black pixels have been removed tends to remain as isolated dots. The possible result is a dot dropout causing picture quality degradation. The separator 25 separates the K component by using the screen cyclicity of CMYK employed by the screen processor.

Figure 2:
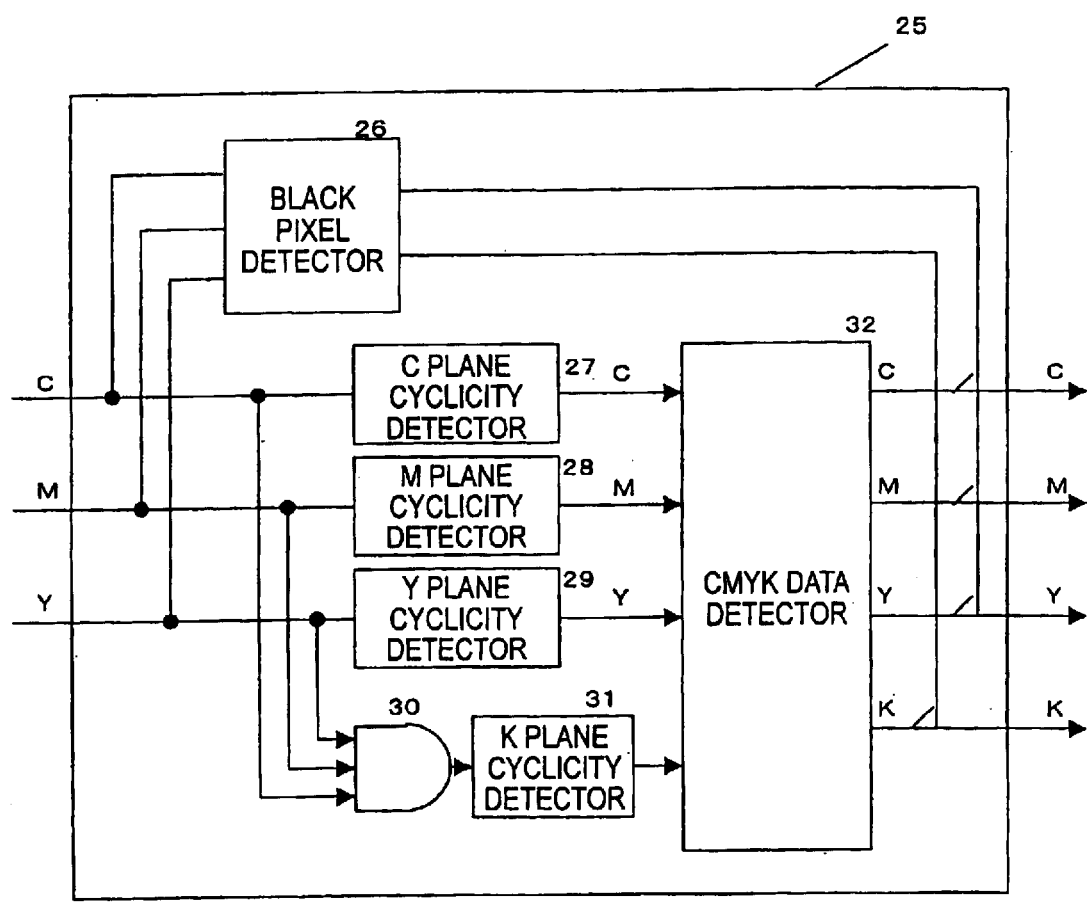
FIG. 2 is a block diagram of the separator.

FIG. 2 is a block diagram of the separator 25.

A numeral 26 designates a black pixel detector for detecting a black pixel by checking the pixel pattern of CMY, 27 a C plane cyclicity detector for detecting the cyclicity of C plane data, 28 an M plane cyclicity detector for detecting the cyclicity of M plane data, 29 a Y plane cyclicity detector for detecting the cyclicity of Y plane data, 30 an AND operation unit for carrying out the logical AND among C, M, Y, 31 a K plane cyclicity detector for detecting the cyclicity of K plane data, and 32 a CMYK data generator for generating K data as well as CMY data where K data has been removed.

Next, operation of each section of the separator 25 is described below. The black pixel detector 26, receiving ROP-processed binary CMY data checks the pattern of each of these planes and, in case the pattern are equal among these, generates the pattern as K and sets the C, M, Y plane data to 0. For example, in case a pattern is checked every eight bits, when the C, M, Y patterns are 00101100, the bit pattern of K is set to 00101100 and the C, M, Y bit patterns are set to 00000000. As a result, characters in black are output in monochrome black. In case the input bit patterns of CMY are equal with each other, the output is the final output of the separator 25. Otherwise, the output of the CMYK data generator 32 is the final output of the separator 25.

Figure 3A:
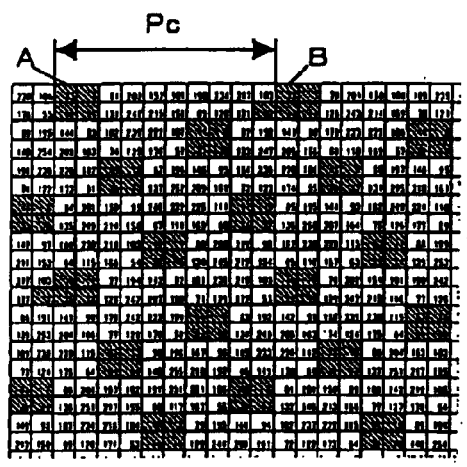
FIGS. 3A to 3D illustrate the screen cyclicity.
Figure 3B:
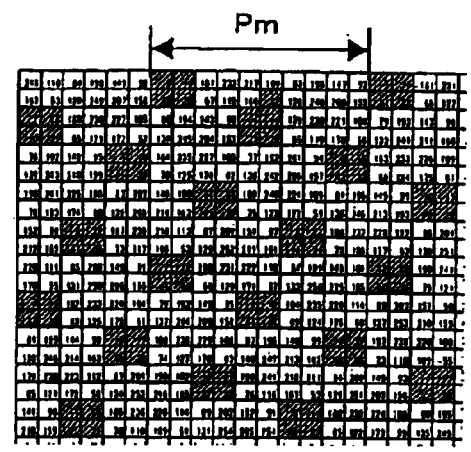
Figure 3C:
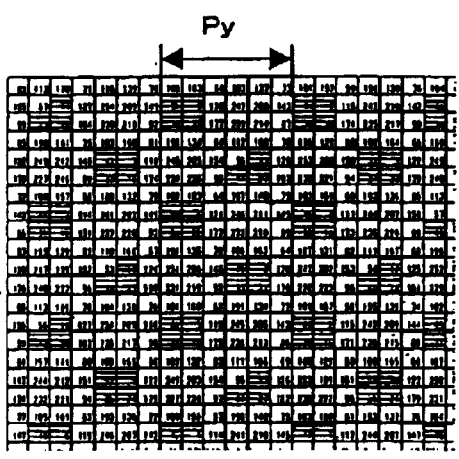
Figure 3D:
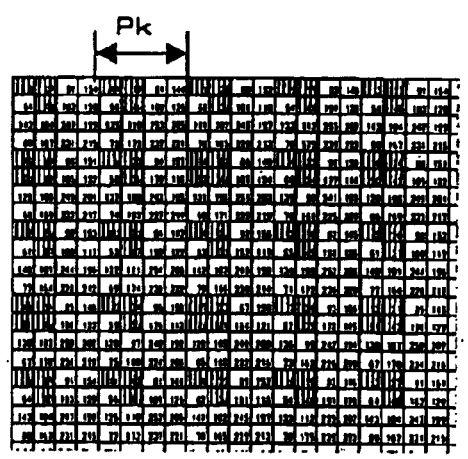

Next, processing in the C plane C plane cyclicity detector 27 is described below. FIGS. 3A to 3D illustrate the screen cyclicity. FIG. 3A illustrates the C screen cyclicity, FIG. 3B the M screen cyclicity, FIG. 3C the Y screen cyclicity, and FIG. 3D the K screen cyclicity. The C screen cyclicity is described as a representative example. In case a pixel A is a start point and a same pattern appears Pc pixels away, on a pixel B in this example, the number of pixels Pc from the pixel A to the pixel B is assumed as the C plane cyclicity. Similarly, the M, Y, K screen cyclicities are Pm, Py, and Pk respectively.

Figure 4:
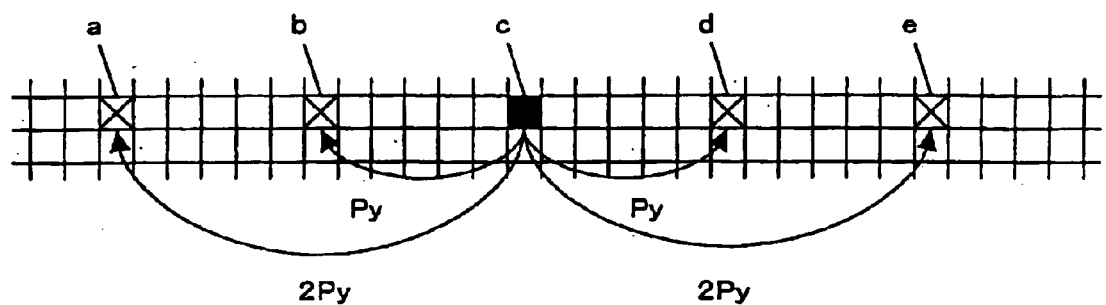
FIG. 4 illustrates the cyclicity detection.

FIG. 4 illustrates the cyclicity detection. The Y plane cyclicity detector 29 is described as representative example of the CMYK planes. In case a pixel is present on a focused pixel c, it is detected whether a pixel is present on a pixel b and a pixel d which are Py pixels away, that is, one cycle away from the focused pixel c in forward and backward directions. The result is used as a factor for determination of cyclicity. Considering a case where cyclicity is not determined only through detection of points Py away from the start point in forward and backward directions due to setting of a screen threshold value and a change in the gray-scale level of the original image, points two cycles away from the start point are also detected to determine the cyclicity. In case the points two cycles away are also detected, presence/absence of the pixel a and the pixel c is also used as a factor for determination of cyclicity. To be more precise, in case pixels are present at the positions one screen cycle away from the focused pixel c in forward and backward directions, or in case pixels are present at the positions one screen cycle and two screen cycles away from the focused pixel c in forward or backward directions, the focused pixel c is determined cyclic.

Figure 5A:
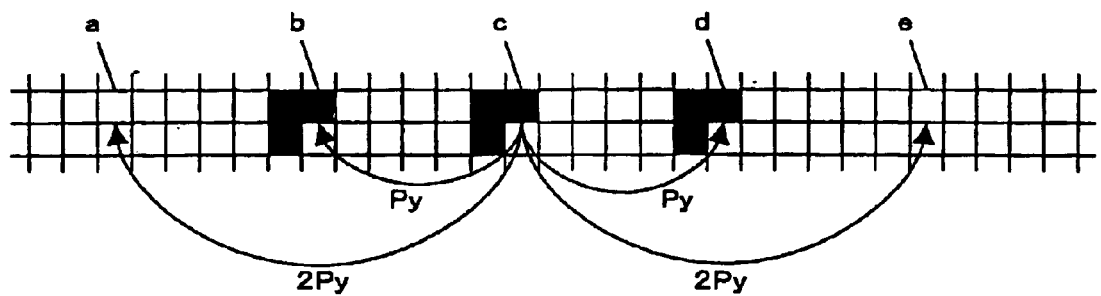
FIGS. 5A and 5B illustrate the cyclicity detection where the focused pixel is assumed cyclic.
Figure 5B:
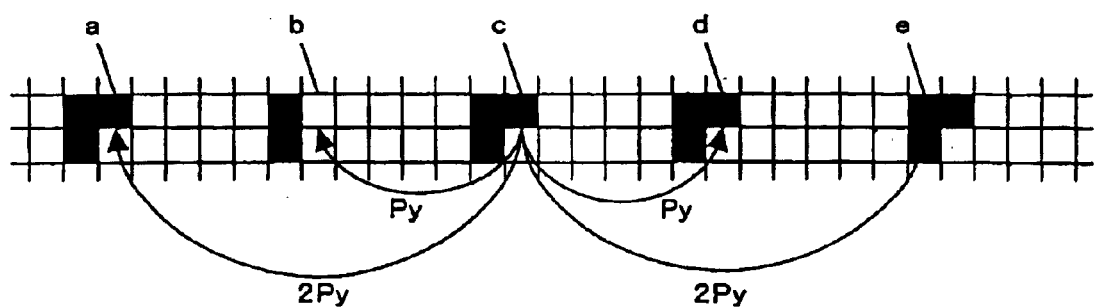

FIGS. 5A and 5B show an example where the focused pixel is assumed cyclic. FIG. 5A shows an example where the focused pixel is assumed cyclic because pixels are present one cycle away from the focused pixel in forward and backward directions. FIG. 5B shows an example where the focused pixel is assumed cyclic because pixels are present one cycle and two cycles away from the focused pixel in backward direction.

Figure 6A:
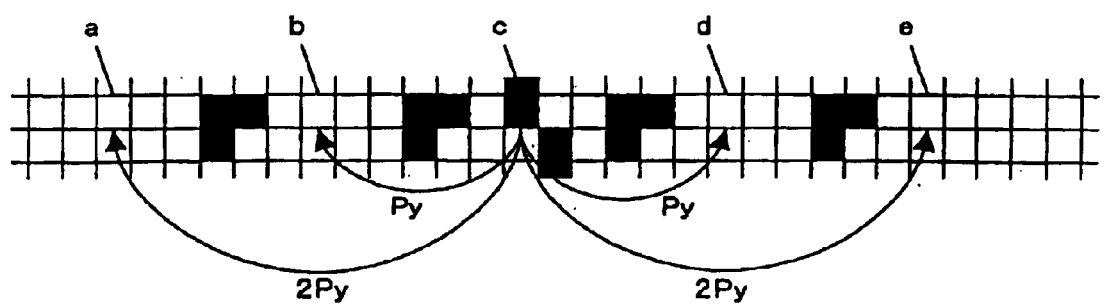
FIGS. 6A and 6B illustrate the cyclicity detection where the focused pixel is assumed non-cyclic.
Figure 6B:
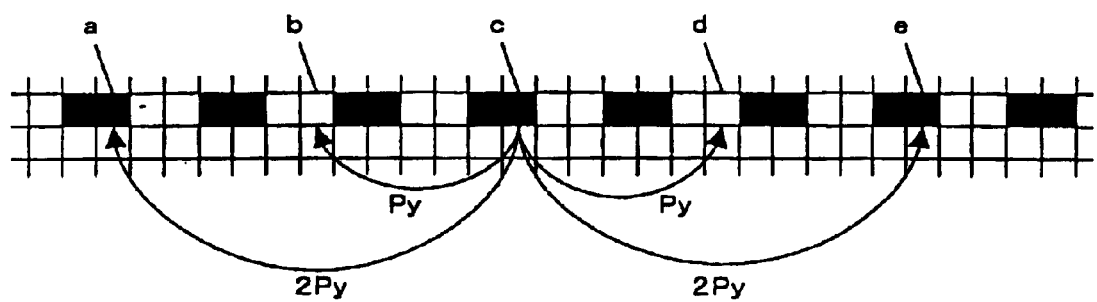

FIGS. 6A and 6B show an example where the focused pixel is assumed as non-cyclic. FIG. 6A shows an example where the focused pixel is assumed as non-cyclic because pixels are absent one cycle and two cycles away from the focused pixel in backward directions. FIG. 6B shows an example where the focused pixel is assumed as non-cyclic because pixels are present two cycles away from the focused pixel in forward and backward directions but absent one cycle away from the focused pixel in forward and backward directions.

Processing in each of the C plane cyclicity detector 27 and the M plane cyclicity detector 28 is the same as that in the Y plane cyclicity detector 29 except that the cycle is different.

Next, the C, M, Y input data is ANDed by the AND operation unit 30. Through AND operation, a pixel where C, M and Y are all 1, that is, a black pixel is extracted. The output is input to the K plane cyclicity detector. The K plane cyclicity detector performs the same as the Y plane cyclicity detector described earlier except that the cycle of detection is Pk, in order to check for the cyclicity of the cycle Pk.

Then, the CMYK data generator 32 generates K pixels and removes CMY pixels based on the output of the C plane cyclicity detector 27, the M plane cyclicity detector 28, the Y plane cyclicity detector 29, and the K plane cyclicity detector 31. In this processing, as a principle, a K pixel is generated from a pixel where CMY pixels are overlapping, but is not generated from a pixel determined cyclic on all CMY planes. A pixel from which a K pixel is generated undergoes the CMY pixel removal processing although the CMY pixel removal processing is skipped depending on the result of determination of the cyclicity on each of the CMY planes. FIG. 11 shows a table describing the operation of the CMYK data generator 32. Generation of a K pixel and removal of CMY pixels are determined based on this table. The image data on the CMYK planes thus generated is the output data of the separator.

The aforementioned operation is described referring to an example of image.

Figure 7A:
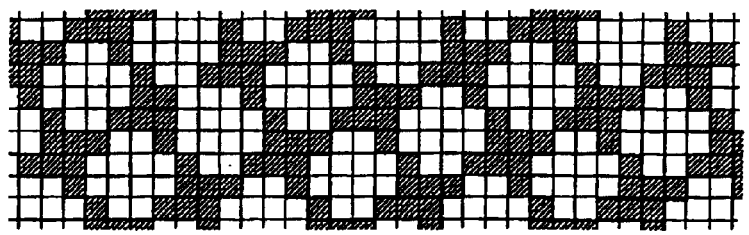
FIGS. 7A to 7D are enlarged views of a binarized image.
Figure 7B:
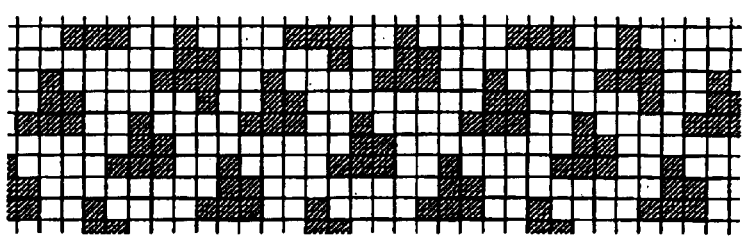
Figure 7C:
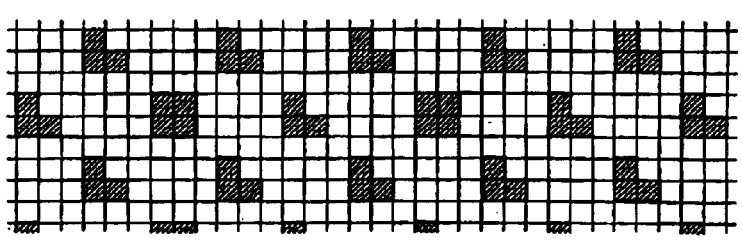
Figure 7D:
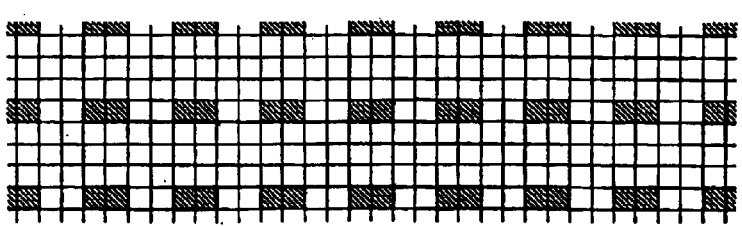
Figure 8A:
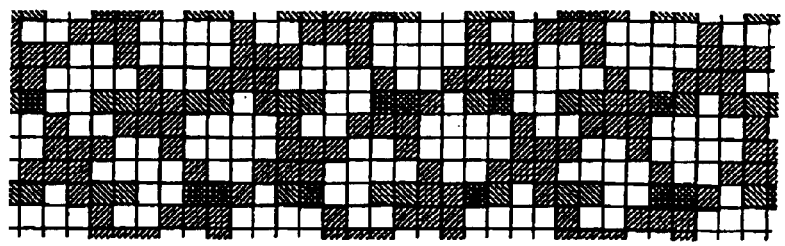
FIGS. 8A to 8D are outputs image of the superimposing section.
Figure 8B:
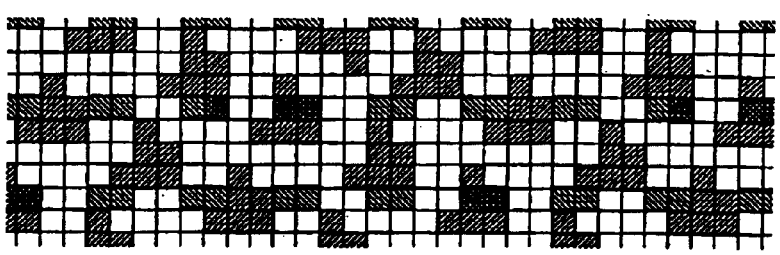
Figure 8C:
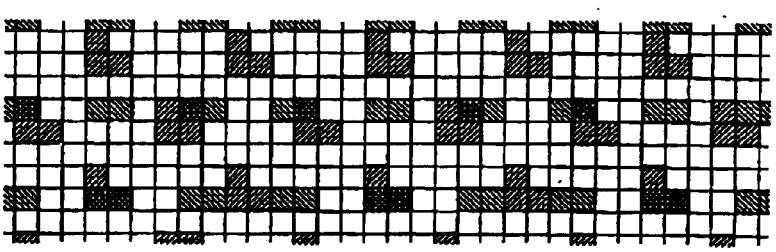
Figure 8D:
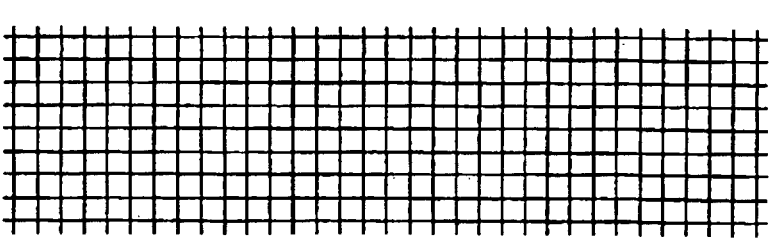

FIGS. 7A to 7D are enlarged views of an image obtained through binarization of an image of a color. Each square represents one pixel of 600 dpi. FIG. 7A represents the C plane, FIG. 7B the M plane, FIG. 7C the Y plane, and FIG. 7D the K plane. These figures correspond to the output of the screen processor 23 in FIG. 1.

FIGS. 8A to 8D are output images of the superimposing section 23. A K image is superimposed on the CMY data and the image obtained includes CMY data alone, which assures successful ROP operation in the ROP processor 25.

Figure 9A:
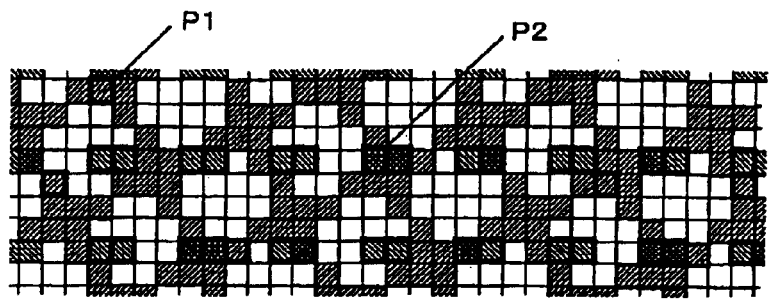
FIGS. 9A to 9D illustrate the operation of the separator.
Figure 9B:
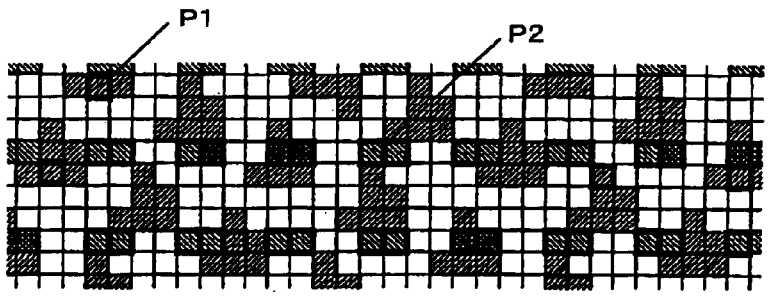
Figure 9C:
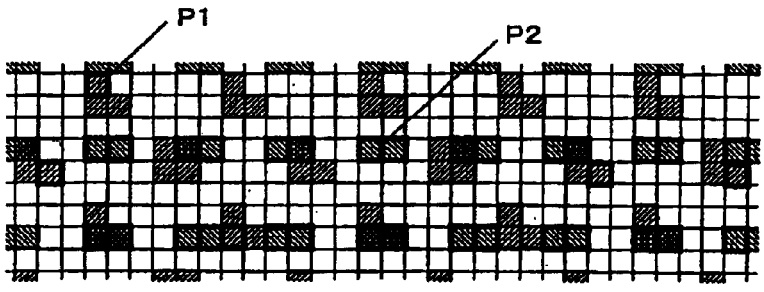
Figure 9D:
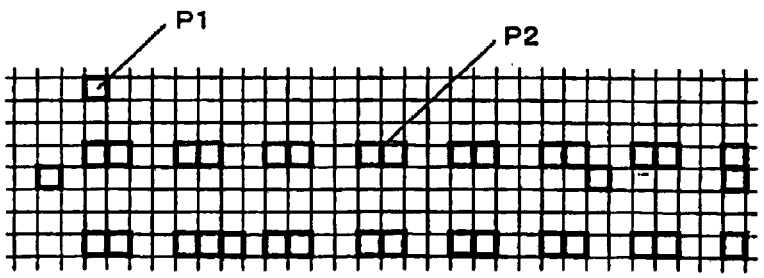
Figure 10A:
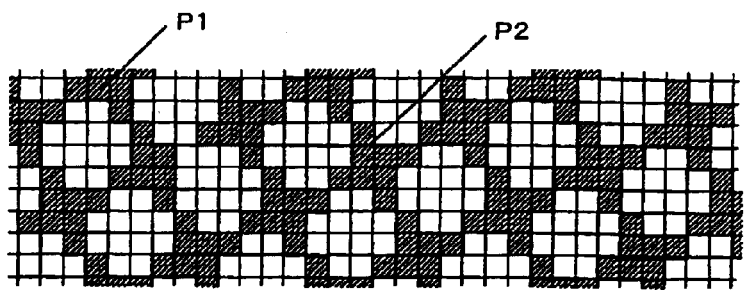
FIGS. 10A to 10D show the processing result of the separator.
Figure 10B:
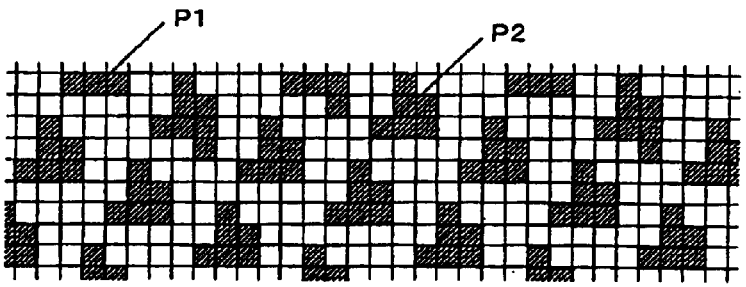
Figure 10C:
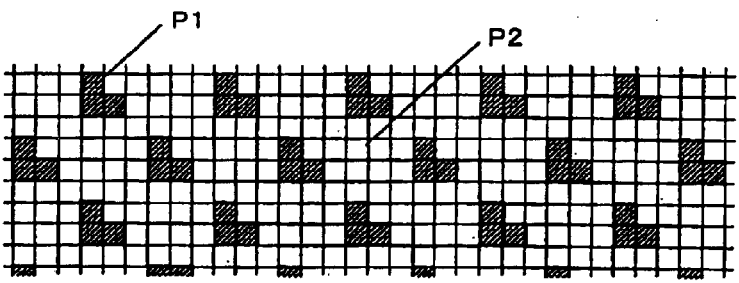
Figure 10D:
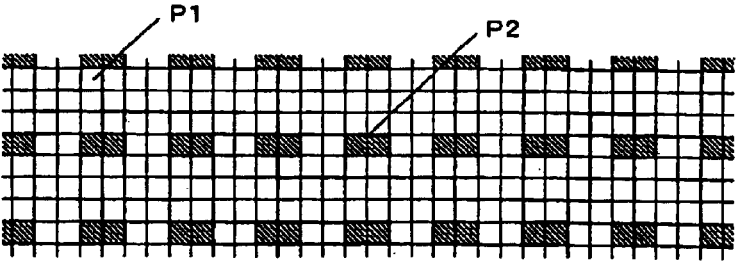
Figure 12:
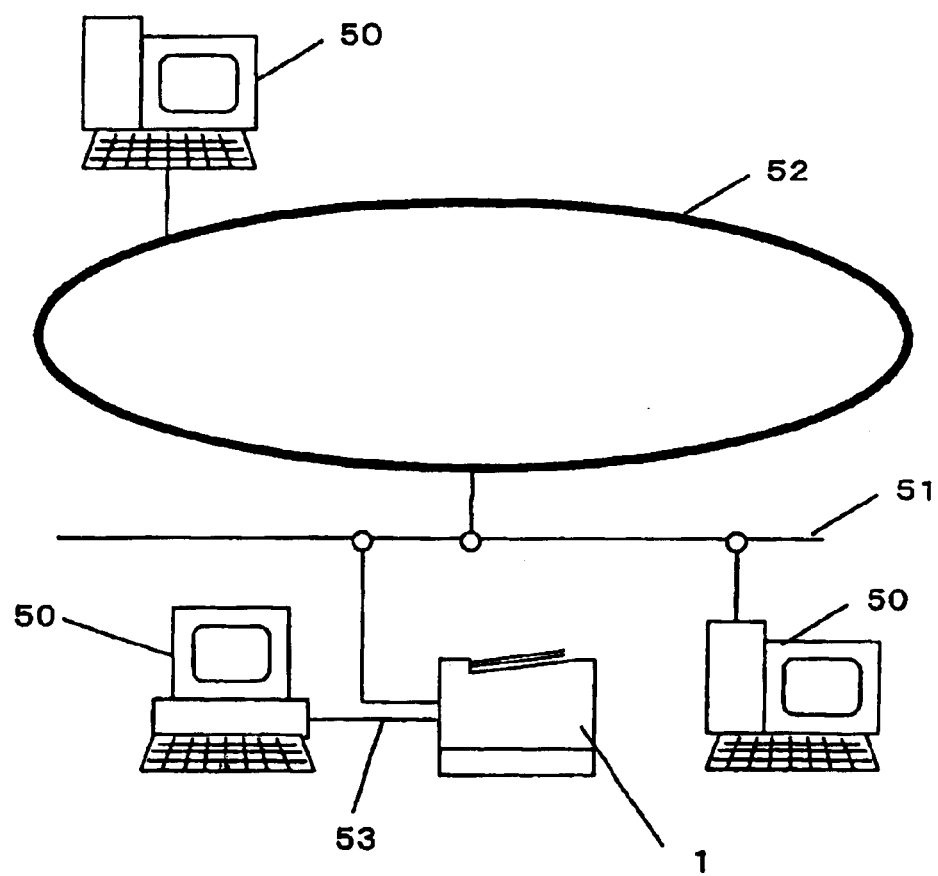
FIG. 12 illustrates the connection form of a host computer and a color printer.

FIGS. 9A to 9D illustrate the operation of the separator 25. Pixels, or black pixels, where pixels are present on the C, M and Y planes are enclosed with thick lines. The black pixels include those generated by the superimposing section 23 and those generated due to overlapping C, M, Y plane data of a binary image prior to superimposing of K data. The separation processing is made on these black pixels. In FIG. 9D also, the portion of pixels where CMY pixels overlap is enclosed with thick lines.

A pixel P1 is described below. The pixel P1 has different pixels patterns (bit patterns around and including the pixel P1) between the CMY planes. Thus the processing is skipped in the black pixel detector 26 of the separator 25. Pixel cyclicity on each plane is detected by the C plane cyclicity detector 27, the M plane cyclicity detector 28, the Y plane cyclicity detector 29, and the K plane cyclicity detector 31. Operation is made to detect a 10-pixel cycle for the C and M planes, a 6-pixel cycle for the Y plane, and a 4-pixel cycle for the K plane.

The pixel P1 is determined cyclic on the C, M and Y planes while non-cyclic on the K plane. The CMY data generator 32 generates pixels on the CMY planes without generating pixels on the K plane based on the Table in FIG. 11.

The pixel P2 as another example is described below. Same as the pixel P1, cyclicity of the pixel P2 is detected by the cyclicity detectors. The pixel P2 is determined cyclic on the C plane while non-cyclic on the M and Y planes and cyclic on the K plane again. The CMY data generator 32 generates pixels on the C and K planes based on the Table in FIG. 11.

The result of the above operation on all the target pixels is shown in FIGS. 10A to 10D. Screens are separated in the operation result of the separator 25, similar to the state of the C, M, Y, K screens assumed before processing in FIGS. 7A to 7D with negligible degradation of picture quality.

While color conversion user LUTs and their interpolation to obtain the four colors CMYK in the foregoing description, it is possible to obtain the three colors CMY on LUTs then obtain the four colors CMYK by way of base color removal processing. In this case, assuming that the base color removal processing on an achromatic color outputs all data as monochrome K, gray turns to monochrome black.

While detection of cyclicity of each pixel is made based on the presence/absence of a pixel in the main scan direction (horizontal direction) with respect to a focused pixel in the cyclicity detector for each plane, it is possible to detect the presence/absence of a pixel screen cycle or a multiple thereof away in the sub-scan direction with respect to a focused pixel in order to determine the cyclicity of the pixel.

While an image processor according to the invention may be implemented using dedicated hardware, general CPU, ROM and RAM may be used to compose the image processor to provide the same processing.

While a printer engine for a color printer using the principle of electronic photography is described in an embodiment of the invention, other printer engines which do not use the principle of electronic photography may be also used.

As understood from the foregoing description, the invention superimposes four colors one on the other then converts the four colors to three colors, on which ROP processing is made. This provides a trouble-free logical operation result.

The separator uses the cyclicity of an image screen to perform ON/OFF control of an image. This practically prevents pixels from changing into isolated points and disappearance of pixels is negligible, so that it is possible to suppress degradation of picture quality such as occurrence of texture.

C, M, Y K data may be processed independently before screen superimposing. Gamma processing may be made on C, M, Y components as well as K component An achromatic color is converted to monochrome black in color conversion. A gray image is printed in monochrome black so that the gray balance is not lost. In particular, gray level is not changed even in case C, M, Y data is independently adjusted through gamma correction. Transition from black to gray and from an achromatic color to a chromatic color is smooth.

What is claimed is:

1. An image processor comprising:

color conversion means for converting an input signal to color signals of at least four colors;

gamma correction means for performing gamma correction on said color signals;

binarization means for binarizing said color signals through comparison with a threshold value;

superimposing means for superimposing a color signal of at least one color out of said binarized color signals on another color signal to convert the signals to a superimposed color signal;

logical operation means for performing a logical operation previously defined for an image of three or fewer colors on said superimposed color signal; and separation means for separating color signals as an output of said logical operation means into separated color signals of at least four colors.

2. The image processor according to claim 1, wherein said binarization means comprises a threshold matrix having a cyclicity for binarization and that said separation means determines whether said superimposed signal has the cyclicity of said threshold matrix used by said binarization means and generates separated color signals based on the determination result.

3. The image processor according to claim 1, wherein the output signals of said color conversion means correspond to four colors cyan, magenta, yellow and black, that said superimposing means obtains the logical sum of a black pixel with pixels of cyan, magenta and yellow to output said superimposed color signal as three colors cyan, magenta and yellow, and that said separation means separates an image of cyan, magenta, yellow and black from said pixels of cyan, magenta and yellow.

4. The image processor according to claim 3, characterized in that, when the input signal to said color conversion means is achromatic, said image processor outputs only black while setting the value of cyan, magenta and yellow to 0.

* * * * *